United States Patent [19]
Sandford

[11] Patent Number: 4,784,028
[45] Date of Patent: Nov. 15, 1988

[54] MANDREL ASSEMBLY FOR A PORTABLE LATHE

[75] Inventor: William E. Sandford, Camino, Calif.
[73] Assignee: Tri Tool, Inc., Rancho Cordova, Calif.
[21] Appl. No.: 911,139
[22] Filed: Sep. 24, 1986
[51] Int. Cl.$^4$ ............................................. B23B 3/22
[52] U.S. Cl. ........................................ 82/4 R; 82/4 C
[58] Field of Search ............ 51/DIG. 3; 82/4 C, 4 R, 82/2 R, 20, DIG. 6

[56] References Cited

U.S. PATENT DOCUMENTS

| | | |
|---|---|---|
| 1,056,480 | 3/1913 | Wood . |
| 1,719,599 | 7/1929 | Dickson ................................... 82/4 R |
| 2,720,132 | 10/1955 | Layne et al. . |
| 2,738,980 | 3/1956 | Spahn . |
| 3,561,302 | 2/1971 | Keener ................................... 82/1 C |
| 3,772,944 | 11/1973 | Becker et al. ......................... 82/4 C |
| 3,776,562 | 12/1973 | Gross et al. . |
| 3,875,832 | 4/1975 | Mayfield ................................ 82/4 C |
| 3,927,584 | 12/1975 | Mayfield ................................ 82/4 C |
| 3,951,018 | 4/1976 | Gilmore ................................. 82/4 C |
| 3,982,451 | 9/1976 | Gilmore ................................. 82/4 C |
| 4,066,270 | 1/1978 | Elkin . |
| 4,257,289 | 3/1981 | Groothius .............................. 84/4 C |
| 4,364,290 | 12/1982 | Astle ..................................... 82/36 R |
| 4,437,366 | 3/1984 | Astle . |
| 4,498,820 | 2/1985 | Brennan ................................ 82/1 R |

FOREIGN PATENT DOCUMENTS 876225 3/1953 Fed. Rep. of Germany .
7050 7/1898 Norway .

Primary Examiner—Frederick R. Schmidt
Assistant Examiner—Blynn Shideler
Attorney, Agent, or Firm—Bacon & Thomas

[57] ABSTRACT

A mandrel assembly for a portable lathe is disclosed having a clamping system which will accommodate a wide variety of pipe sizes. Jaw blocks are removably attached to the mandrel attaching block to increase or decrease the clamping size of the mandrel. A mandrel mounting head is readily removable from a mandrel shaft so as to provide further variation in clamping size or function. All of the clamp actuating mechanism, as well as the tool feed mechanism is contained within the interior of the mandrel shaft to prevent contamination from external sources, but is readily accessible from the exterior of the mandrel shaft. Laterally spaced apart bearing surfaces between the mandrel attaching blocks and the mandrel mounting head, as well as a torque ring insert interposed between the mandrel shaft and a mandrel adapter provide for the torque reaction between the cutting tool and the mandrel so as to provide a rigid, sturdy base for the cutting tool.

14 Claims, 4 Drawing Sheets

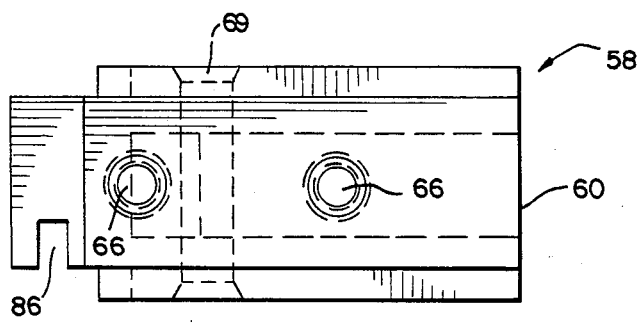
FIG 6
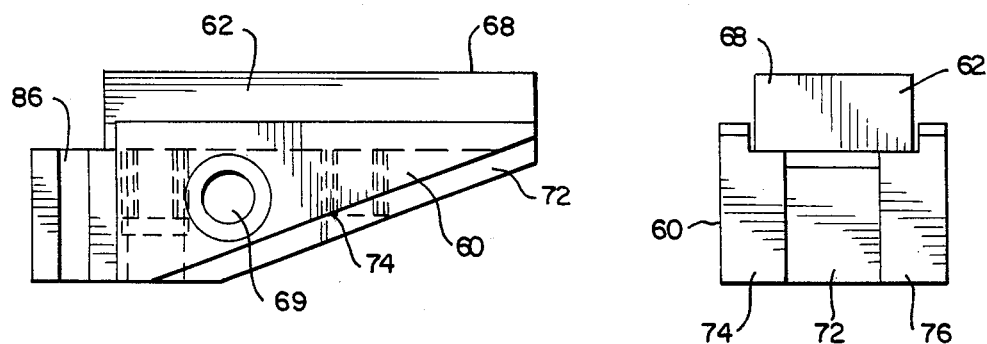
FIG 7
FIG 8

1

MANDREL ASSEMBLY FOR A PORTABLE LATHE

BACKGROUND OF THE INVENTION

This invention relates to a mandrel assembly for attaching a portable lathe to the end of a pipe or tube. Portable lathes are well known and are utilized to perform various machining operations on the end of a pipe or tube. The lathe may have a plurality of cutting tools thereon which may face, bevel or perform other machining operations on the pipe end.

The portable lathe is usually supported on a mandrel which may be attached to the interior of the pipe via a radially expandable and contractable clamping device. To ensure the accuracy of the machining operations performed on the end of the pipe, it is of the utmost importance that the mandrel be coincident with the longitudinal axis of the pipe and be rigidly affixed to the pipe. The clamping device typically comprises a plurality of wedge clamping blocks each having a wedge surface thereon which slidably engages a correspondingly tapered surface formed on a mandrel head. Longitudinal movement of the wedge clamping block with respect to the mandrel head causes the diameter defined by the outer surface of the blocks to expand or contract so as to engage or disengage the inner surface of the pipe.

The portable lathe may be utilized on a wide variety of pipe sizes and it is desirable to have the clamping device accommodate as wide a range of pipe sizes as possible. However, heretofore it has been necessary to completely replace the individual wedge clamping blocks to accommodate the wide variety of pipe sizes.

Also, it is imperative that the torque imparted to the mandrel due to the reaction between the rotating cutting head of the portable lathe and its connection to the mandrel be completely reacted by the mandrel and its clamping device. The rather narrow lateral width of the bearing surfaces between the individual clamping wedges and the mandrel head of the prior art devices has not solved this problem, especially where large torque loads are imparted to the mandrel.

SUMMARY OF THE INVENTION

The present invention provides a mandrel assembly for a portable lathe having a mandrel clamping mechanism which is readily expandable to accommodate a wide variety of pipe sizes. This is accomplished by interchangeable jaw blocks attached to each mandrel attaching block. The jaw blocks may be readily replaced with jaw blocks of different sizes so as to expand or contract the clamping size of the attaching blocks.

The invention also provides laterally spaced apart bearing surfaces for each of the mandrel attaching blocks so as to increase the clamping rigidity under large torque loads. The bearing surfaces are defined on each of the mandrel attaching blocks and corresponding surfaces are formed on the mandrel mounting head. The mandrel mounting head may also be removably attached to the mandrel assembly to facilitate its removal and replacement with a mandrel mounting head of a different size or one having a different function, i.e. offset, miter, etc. This also serves to increase the range of gripping sizes and the uses of the mandrel.

The invention also encompasses the use of a torque ring insert interposed between a mandrel shaft and a mandrel adapter, to which the rotatable cutting head is affixed, to further react the torque generated by the cutting operation. The torque ring insert allows relative longitudinal movement between these elements to facilitate the feeding of the tool along the longitudinal axis of the pipe, but prevents any relative rotation.

The individual mandrel attaching blocks are affixed to an attaching ring butt plate via a key and slot so as to provide an actuation and release mechanism to assist a return spring system and also to distribute the local torque loads on each mandrel attaching block. An end of each of the mandrel attaching blocks defines a notch which is slidably engaged by a key attached to the attaching ring butt plate. This mechanism ensures positive longitudinal movement of the mandrel attaching blocks, while at the same time facilitating their radial expansion and contraction.

BRIEF DESCRIPTION OF THE DRAWINGS

FIG. 6 is a top view of the mandrel attaching block according to the invention.

FIG. 7 is a side view of the mandrel attaching block shown in FIG. 6.

FIG. 8 is a rear view of the mandrel attaching block shown in FIGS. 6 and 7.

DETAILED DESCRIPTION OF THE PREFERRED EMBODIMENT

Figure 1:
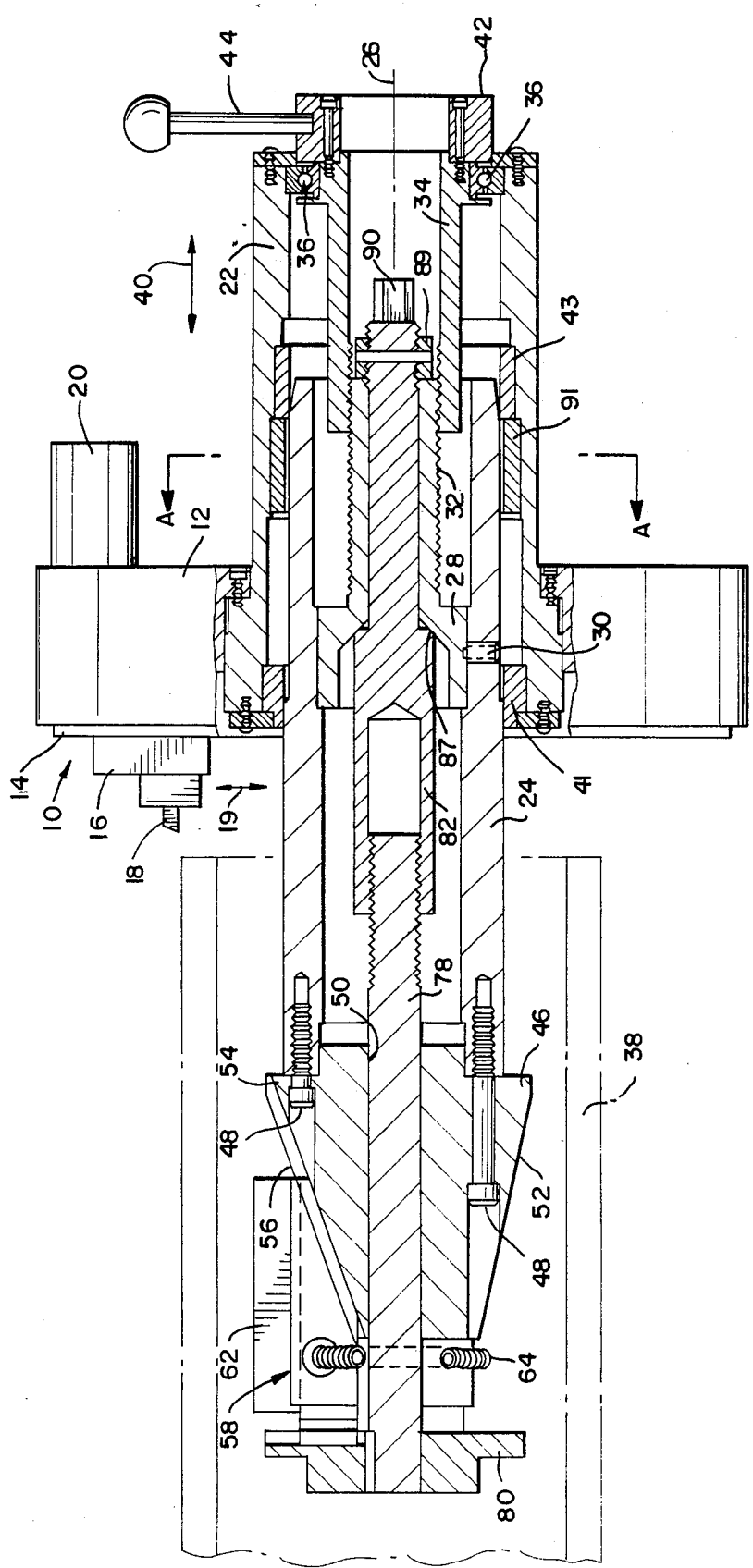
FIG. 1 is a longitudinal cross-sectional view of the mandrel assemly according to the invention.

A portable lathe 10, which may be utilized with the mandrel assembly according to this invention typically comprises a stationary housing 12 and a rotatable cutting head portion 14. Rotatable cutting head portion 14 has mounted thereon a cutting tool holder 16 which holds a cutting tool 18. Although only one cutting tool and cutting tool holder is illustrated, it is to be understood that the rotatable cutting head portion 14 may have a plurality of cutting tools thereon to perform redundant, or alternative machining operations.

The rotatable cutting head portion 14 is rotatably supported by housing 12 and is driven by drive motor 20. Drive motor 20 may have a pinion gear (not shown) attached to its output shaft, engaging a ring gear (not shown) affixed to the rotatable cutting head portion 14. Although this drive system is typical of such portable lathe devices, it is to be understood that the drive system per se forms no part of this invention and any alternative drive system may be utilized without exceeding the scope of this invention.

Cutting tool holder 16, along with cutting tool 18, may be fed in a radial direction shown by arrows 19 as the rotatable cutting head portion 14 rotates by a tool feed mechanism. Typically, this mechanism comprises a threaded shaft (not shown) rotatably attached to the cutting head portion 14 and threadingly engaged with cutting holder 16. A star wheel (not shown) is operatively attached to the threaded shaft and may contact an actuating probe (not shown) rigidly affixed to the housing 12 during each revolution of the cutting head portion 14. As the threaded shaft is thus rotated, the cutting tool holder 16 is fed radially. Again, the tool feed mechanism per se forms no part of the present invention and any known tool feed system may be utilized with this invention.

The cutting head housing 12 is fixedly attached to mandrel adapter 22 which is concentrically arranged about mandrel shaft 24 having a longitudinal axis 26. Feed shaft 28 is attached to the interior of the hollow mandrel shaft 24 and is prevented from relative rotation therewith by pins 30 which may be threadingly engaged with the mandrel shaft 24 and which may have protrusions engaging corresponding openings in the periphery of feed shaft 28. Although only one such pin 30 is illustrated, it is to be understood that a plurality of pins may be utilized.

Feed shaft 28 has threads 32 formed thereon so as to threadingly engage corresponding threads formed on feed sleeve 34. Feed sleeve 34 is rotatably attached to mandrel adapter 22 via bearings 36 such that it may rotate relative thereto, but cannot undergo any relative movement in the longitudinal direction. Thus, when the mandrel shaft 24 is rigidly clamped to pipe 38, by clamping means to be discussed in detail hereafter, rotation of feed sleeve 34 relative to feed shaft 32 causes the sleeve 34, along with the mandrel adapter 22 and the cutting head, to move in the direction of arrow 40, generally parallel to longitudinal axis 26. Bronze bushings 41 and 43 support the mandrel adaptor 22 as it travels over mandrel shaft 24. Rotation of the feed sleeve may be accomplished by annular collar 42, fixedly attached to the feed sleeve, and handle 44. As the handle is manually rotated, the cutting tool 18 may be fed into the end of pipe 38, or may be withdrawn therefrom, depending upon the direction of rotation. The cutting tool 18 may be fed automatically by attaching a feed drive motor (not shown) to collar 42.

Figure 4:
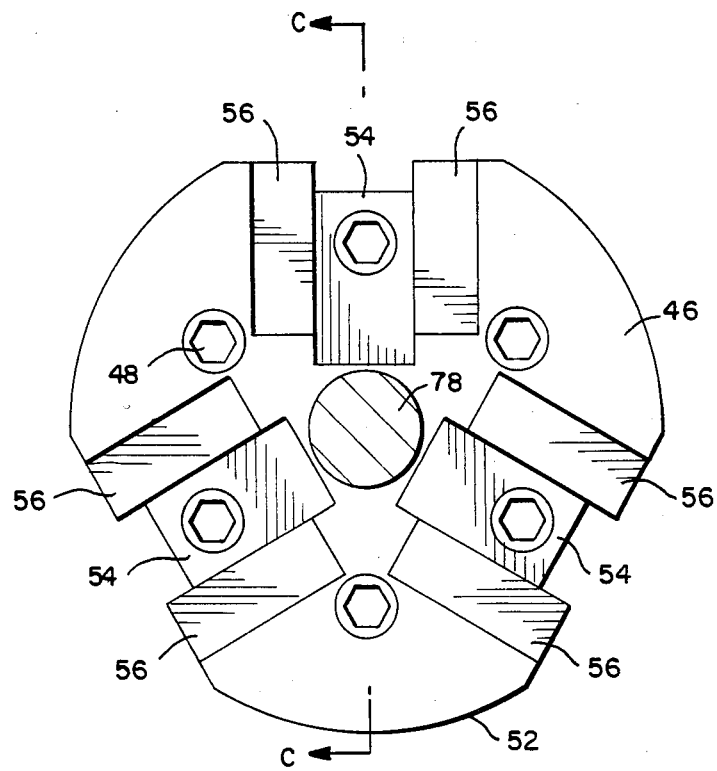
FIG. 4 is a front view of the mandrel head viewing the direction of arrows B—B in FIG. 3.
Figure 5:
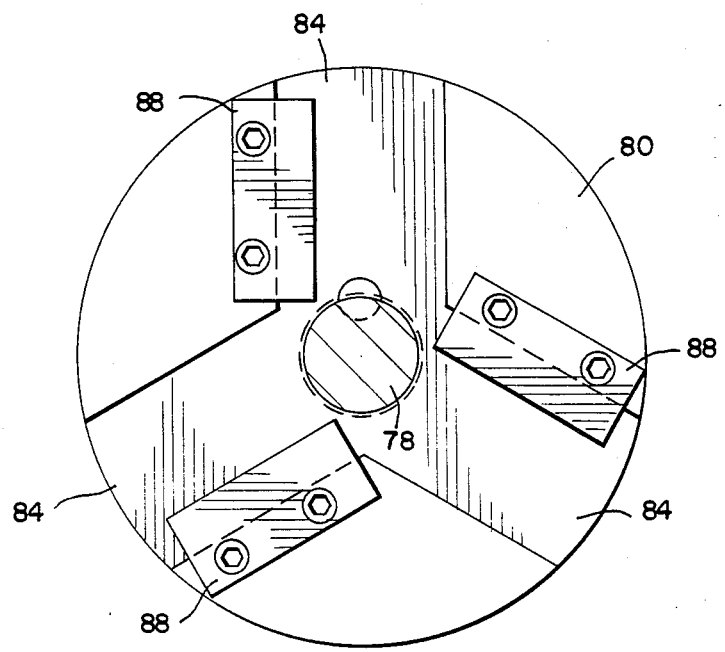
FIG. 5 is a rear view of the mandrel block attaching ring butt plate viewed in the direction of arrows D—D in FIG. 3.

Mandrel mounting head 46 may be removably attached to an end of mandrel shaft 24 via bolts 48 or the like. Mandrel mounting head 46 defines a central opening 50 and has a generally conical outer surface 52. One or more grooves 54 are defined in the outer surface 52 of mandrel head 46. A pair of slide bearing surfaces 56 are formed on either side of each groove 54 such that they are located in a plane which extends at an acute angle with respect to the longitudinal axis 26. This angle may be on the order of 20°. The slide bearing surfaces 56 are laterally spaced apart a distance equal to the width of groove 54. Although three such grooves and pairs of bearing surfaces are shown in FIG. 4, it is to be understood that more or less of these elements could be utilized without exceeding the scope of this invention.

A mandrel attaching block 58, seen best in FIGS. 1, 6, 7 and 8 is slidably received in each of the grooves 54. Mandrel attaching block 58 has a base portion 60, to which a jaw block 62 is removably attached via bolt means 66. The jaw block 62 has a gripping surface 68 which bears against the interior of pipe 38 so as to clamp the mandrel in position. Base portion 60 has an extension 72 extending from a lower side thereof which extension is slidably received within groove 54. The underside of base portion 60 adjacent either side of extension 72 defines oblique bearing surfaces 74 and 76 which slidably engage laterally spaced apart bearing surfaces 56 on the mandrel head 46. As is evident from FIG. 8, bearing surfaces 74 and 76 are also laterally spaced apart. Thus, as can be seen, when the mandrel attaching blocks 58 are moved longitudinally with respect to the mandrel mounting head 46, the diameter defined by the gripping surfaces 68 may be increased, to clamp the mandrel into the pipe, or decreased so as to release it therefrom.

Longitudinal movement of the mandrel attaching blocks 58 is achieved by draw bar 78, attaching ring butt plate 80 which is fixedly mounted on draw bar 78 and is attached to each of the mandrel attaching blocks 58 and draw bar actuating shaft 82. Attaching ring butt plate 80 is fixedly attached to an end of draw bar 78 and extends generally transverse to longitudinal axis 26. Draw bar 78 slidably extends through central opening 50 in mandrel mounting head 46. Attaching ring butt plate 80 defines generally radially extending grooves 84, the number of such grooves being equal to the number of mandrel attaching blocks 58. Each of the mandrel attaching blocks 58 defines a notch 86 adjacent an end thereof, the end being slidably received in groove 84. A key member 88 is fixedly attached to attaching ring 80 adjacent a side of each groove 84 such that a portion of the key 88 extends into notch 86. The interengagement of the key member 88 with the notch 86 provides a positive means of moving the mandrel attaching blocks 58 in a longitudinal direction, while the dimensions of the key member and notch are such that the mandrel attaching block 58 may slide relative to the attaching ring 80 in a direction transverse to longitudinal axis 26.

Tension spring 64 passes through openings 69 formed in each of the mandrel attaching blocks 58 to provide a positive means for keeping each of the mandrel attaching blocks 58 in contact with mandrel mounting head 46 and to provide a positive retracting force for the mandrel attaching block 58.

An internal end of draw bar 78 is threadingly engaged with an end of draw bar actuator shaft 82, as shown in FIG. 1. Draw bar actuating shaft 82 is rotatably mounted with respect to the mandrel shaft 24 and feed shaft 28. Relative longitudinal movement is prevented by collar 89 attached to actuating shaft 82 and bearing shoulder 87 which contacts a corresponding shoulder formed on feed shaft 28.

Actuating shaft 82 has a polygonal shaped portion 90 formed thereon, which may be engaged by a known, standard sized wrench or the like. Portion 90 is accessible through hollow feed sleeve 34 and the opening defined by annular collar 42. Thus, as can be seen, in order to attach the mandrel assembly to the interior of a pipe, a wrench, such as a socket wrench or the like, is placed over portion 90 and the draw bar actuating shaft 82 is rotated. Such rotation causes the draw bar 78 to move in a direction generally parallel to the longitudinal axis 26 due to the interengagement of the threaded portions between the actuating shaft 82 and draw bar 78. Rotation of draw bar 78 is prevented due to the actuating ring butt plate 80 and its interconnection with mandrel attaching blocks 58 which, in turn, engage grooves 54 formed in mandrel head 46. Thus, as draw bar 78 moves in a longitudinal direction, attaching ring butt plate 80 causes the mandrel mounting blocks 58 to slide with respect to mandrel mounting head 46. Due to the angular orientation of the slide bearing surfaces, the grippinhg surface 68 of the mandrel mounting blocks are brought into contact with the interior surface of pipe 38. Once the mandrel is attached to the pipe, handle 44 may be rotated so as to bring the cutting tool into its operative position with respect to the end of pipe 38.

Figure 2:
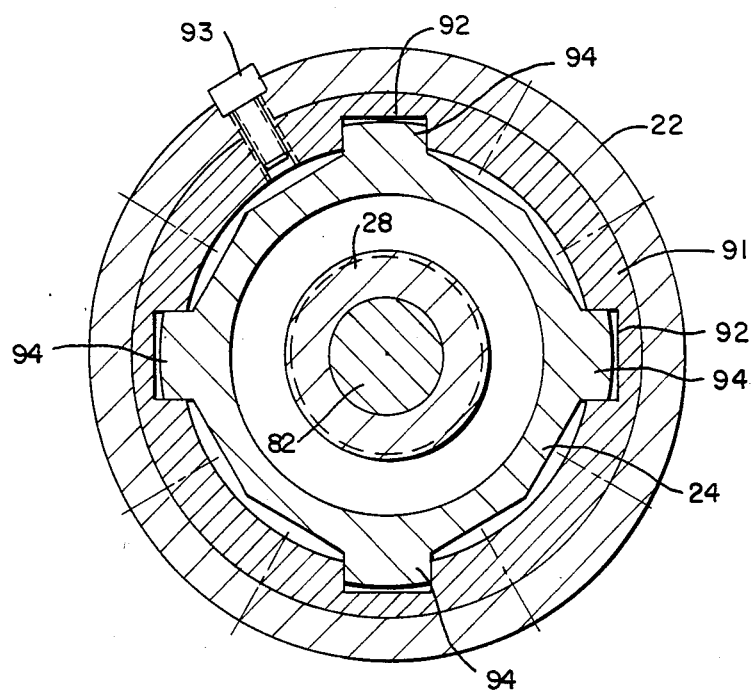
FIG. 2 is a cross-sectional view of the mandrel assembly taken along line A—A in FIG. 1.
Figure 3:
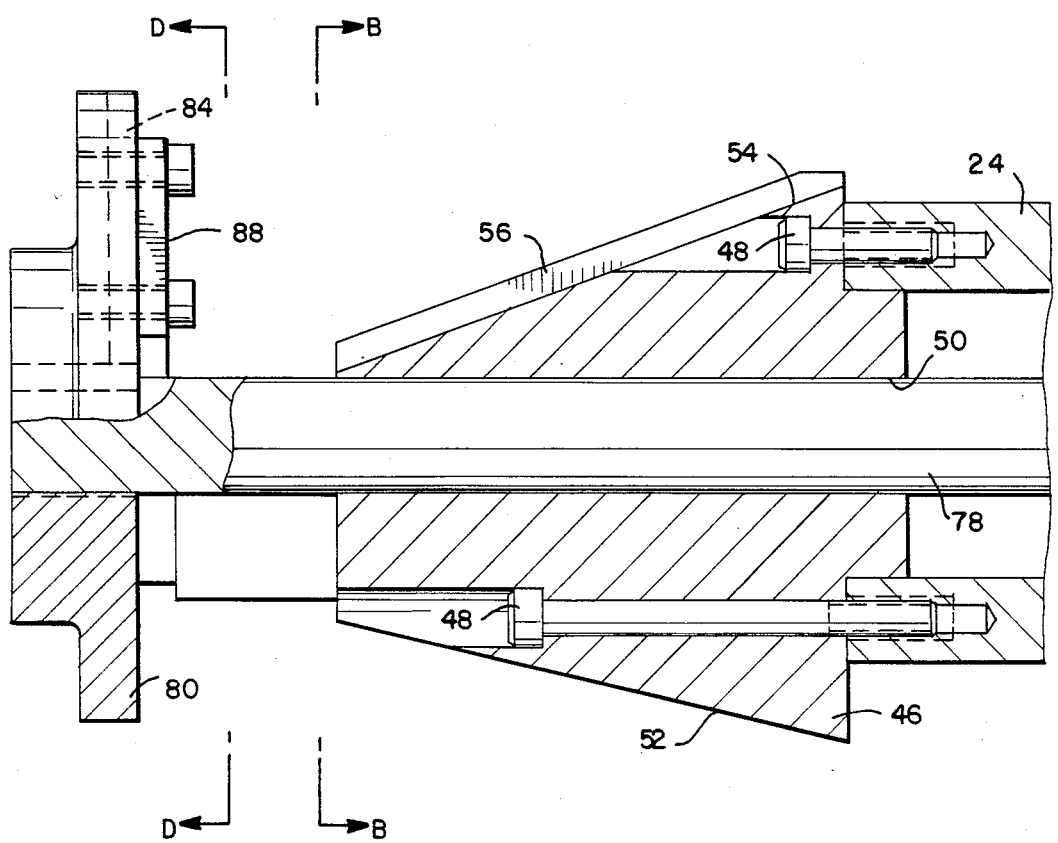
FIG. 3 is a cross-sectional view of the mandrel head taken along line C—C in FIG. 4.

A torque ring insert 91 is operatively interposed between mandrel shaft 24 and mandrel adapter 22. As best seen in FIGS. 1 and 2, torque ring insert 91 is rigidly affixed to an interior surface of mandrel adapter 22 via bolts 93 or the like. Torque ring insert 91 defines one or more internally opening, longitudinally extending grooves 92 which slidably engage a corresponding number of longitudinal protrusions 94, formed on mandrel shaft 24. Torque ring insert 91 allows relative longitudinal movement between mandrel adapter 22 and mandrel shaft 24 in the direction of arrow 40 (shown in FIG. 1), but prevents any relative rotation between these elements. The rigidity of longitudinal protrusions 94 and their engagement with longitudinal grooves 92 provide a substantial surface with which to react the torque transmitted to the mandrel shaft by rotation of the cutting head. The torque ring insert, coupled with the laterally spaced apart bearing surfaces formed on the mandrel mounting head 46 and the mandrel attaching blocks 58 provide a sturdy, rigid support for the rotatable cutting head portion 14. This allows cutting tool 18 to accurately and efficiently perform its machining function on the end of pipe 38.

In addition to providing such a rigid support for the cutting tool, the invention also enables the use of the mandrel with a wide variety of pipe sizes. The gripping range of the mandrel attaching blocks may be varied by attaching different size jaw blocks to the portion. Furthermore, the mandrel mounting head 46 is readily removed from the remaining mandrel assembly so as to facilitate the use of mounting heads of different sizes or functions. Both the attaching blocks and the mounting head may be readily removed and replaced without disassembling or disturbing the remainder of the mandrel assembly.

All of the clamping actuating mechanism, as well as the cutting head feed mechanism are located internally within the mandrel shaft so as to prevent contamination of these elements with cutting chips or cutting fluid during the machining operation. At the same time, however, all of these elements are readily accessible from outside of the mandrel shaft.

The foregoing is provided for illustrative purposes only and should not be construed as any way limiting this invention, the scope of which is defined solely by the appended claims.

What is claimed is:

1. In a mandrel assembly for a portable lathe having a non-rotatable mandrel shaft, a mandrel adaptor non-rotatably and slidably mounted on the mandrel shaft, and a rotatable cutting head supported on the mandrel adaptor the improvements comprising:
   (a) a mandrel mounting head attached to a first end of the mandrel shaft, the mounting head defining at least one groove extending in a first plane forming an acute angle with a longitudinal axis of the mandrel shaft and at least one pair of laterally spaced apart, first bearing surfaces located adjacent each side of the at least one groove, each pair of first bearing surfaces being substantially coplanar and extending in a second plane forming an acute angle with the longitudinal axis of the mandrel shaft;
   (b) at least one mandrel attaching block located on the mandrel mounting head, the at least one mandrel attaching block having a gripping surface and a pair of laterally spaced apart, second bearing surfaces in slidable contact with the pair of laterally spaced apart first bearing surfaces; and,
   (c) a torque ring insert mounted between the mandrel adaptor and the mandrel shaft to allow relative movement therebetween in a longitudinal direction, but prevent relative rotation therebetween so as to react the torque generated by the rotatable cutting head.

2. A mandrel assembly for a portable lathe having a rotatable cutting head, the mandrel assembly comprising:
   (a) a hollow mandrel shaft having a longitudinal axis, a first end to be attached to a pipe and a second end;
   (b) a cutting head housing rotatably supporting the rotatable cutting head;
   (c) a non-rotatable mandrel adaptor attached to the cutting head housing and slidably attached to the second end of the hollow mandrel shaft;
   (d) a torque ring insert mounted between the mandrel adapter and the mandrel shaft to allow relative movement therebetween in a direction generally parallel to the longitudinal axis, but prevent relative rotation therebetween about the longitudinal axis so as to react torque generated by the rotatable cutting head;
   (e) feed means to feed the rotatable cutting head in a direction generally parallel to the longitudinal axis;
   (f) a mandrel mounting head attached to the first end of the mandrel shaft, the mounting head defining at least one groove extending in a first plane forming an acute angle with the longitudinal axis and at least one pair of laterally spaced apart, substantially flat first bearing surfaces located adjacent each side of the at least one groove, each pair of first bearing surfaces being substantially coplanar and extending in a second plane forming an acute angle with the longitudinal axis;
   (g) at least one mandrel attaching block having a gripping surface and a pair of laterally spaced apart, substantially flat second bearing surfaces in slidable contact with the pair of laterally spaced apart first bearing surfaces;
   (h) draw bar means extending through at least a portion of the hollow mandrel shaft so as to be movable with respect thereto in a direction generally parallel to the longitudinal axis;
   (i) attaching means attaching the at least one mandrel attaching block to the draw bar means; and,
   (j) actuating means interposed between the draw bar means and the mandrel shaft to move the draw with respect to the mandrel shaft thereby moving the at least one mandrel attaching block with respect to the mandrel mounting head so as to increase or decrease the transverse distance between the longitudinal axis and the gripping surface of the at least one mandrel attaching block.

3. The mandrel assembly according to claim 2 further comprising gripping surface extension means removably attached to the at least one mandrel attaching block so as to vary the transverse distance between the gripping surface and the longitudinal axis.

4. The mandrel assembly according to claim 3 wherein the gripping surface extension means comprises:
   (a) a jaw block located on the at least one mandrel attaching block, the jaw block defining the gripping surfaces; and,
   (b) fastening means to removably attach the jaw block to the at least one mandrel attaching block.

5. The mandrel assembly according to claim 2 wherein the attaching means comprises:
   (a) an attaching ring butt plate affixed to the draw bar means, the attaching ring butt plate defining at least one generally radial groove adapted to slidably receive a first end of the at least one mandrel attaching block;
   (b) a notch defined by the at least one mandrel attaching block adjacent to the first end; and,
   (c) at least one key fixedly attached to the attaching ring butt plate and extending into the notch.

6. The mandrel assembly according to claim 5 further comprising gripping surface extension means removably attached to the at least one mandrel attaching block so as to vary the transverse distance between the gripping surface and the longitudinal axis.

7. The mandrel assembly according to claim 6 wherein the gripping surface extension means comprises:
   (a) a jaw block located on the at least one mandrel attaching block, the jaw block defining the gripping surface; and,
   (b) fastening means to removably attach the jaw block to the at least one mandrel attaching block.

8. The mandrel assembly according to claim 2 further comprising:
   (a) at least one longitudinal groove defined by the torque ring insert;
   (b) at least one longitudinal protrusion extending from the mandrel shaft and slidably received in the at least one longitudinal groove; and,
   (c) means to fixedly attach the torque ring insert to the mandrel adapter.

9. The mandrel assembly according to claim 8 wherein the feed means comprises:
   (a) a feed shaft attached to the mandrel shaft, the feed shaft having a threaded portion;
   (b) a feed sleeve attached to the mandrel adapter and threadingly engaged with the feed shaft; and,
   (c) means to rotate the feed sleeve relative to the feed shaft.

10. The mandrel assembly according to claim 9 further comprising gripping surface extension means removably attached to the at least one mandrel attaching block so as to vary the transverse distance between the gripping surface and the longitudinal axis.

11. The mandrel assembly according to claim 10 wherein the gripping surface extension means comprises:
    (a) a jaw block located on of the at least one mandrel attaching block, the jaw block defining the gripping surfaces; and,
    (b) fastening means to removably attach the jaw block to the at least one mandrel attaching block.

12. The mandrel assembly according to claim 9 wherein the attaching means comprises:
    (a) an attaching ring butt plate affixed to the draw bar means, the attaching ring butt plate defining at least one generally radial groove adapted to slidably receive a first end of the at least one mandrel attaching block;
    (b) a notch define by the at least one mandrel attaching block adjacent to the first end; and,
    (c) at least one key fixedly attached to the attaching ring butt plate and extending into the notch.

13. The mandrel assembly according to claim 12 further comprising gripping surface extension means removably attached to the at least one mandrel attaching block so as to vary the transverse distance between the gripping surface and the longitudinal axis.

14. The mandrel assembly according to claim 13 wherein the gripping surface extension means comprises:
    (a) a jaw block located on both sides of the at least one mandrel attaching block, the jaw block defining the gripping surfaces; and,
    (b) fastening means to removably attach the jaw block to the at least one mandrel attaching block.

* * * * *